Nov. 28, 1939.  F. A. BROWNE  2,181,298
CONVEYING MECHANISM
Filed March 14, 1939  4 Sheets-Sheet 1

INVENTOR.
Floyd A. Browne
BY Lawler & Lawler
ATTORNEYS.

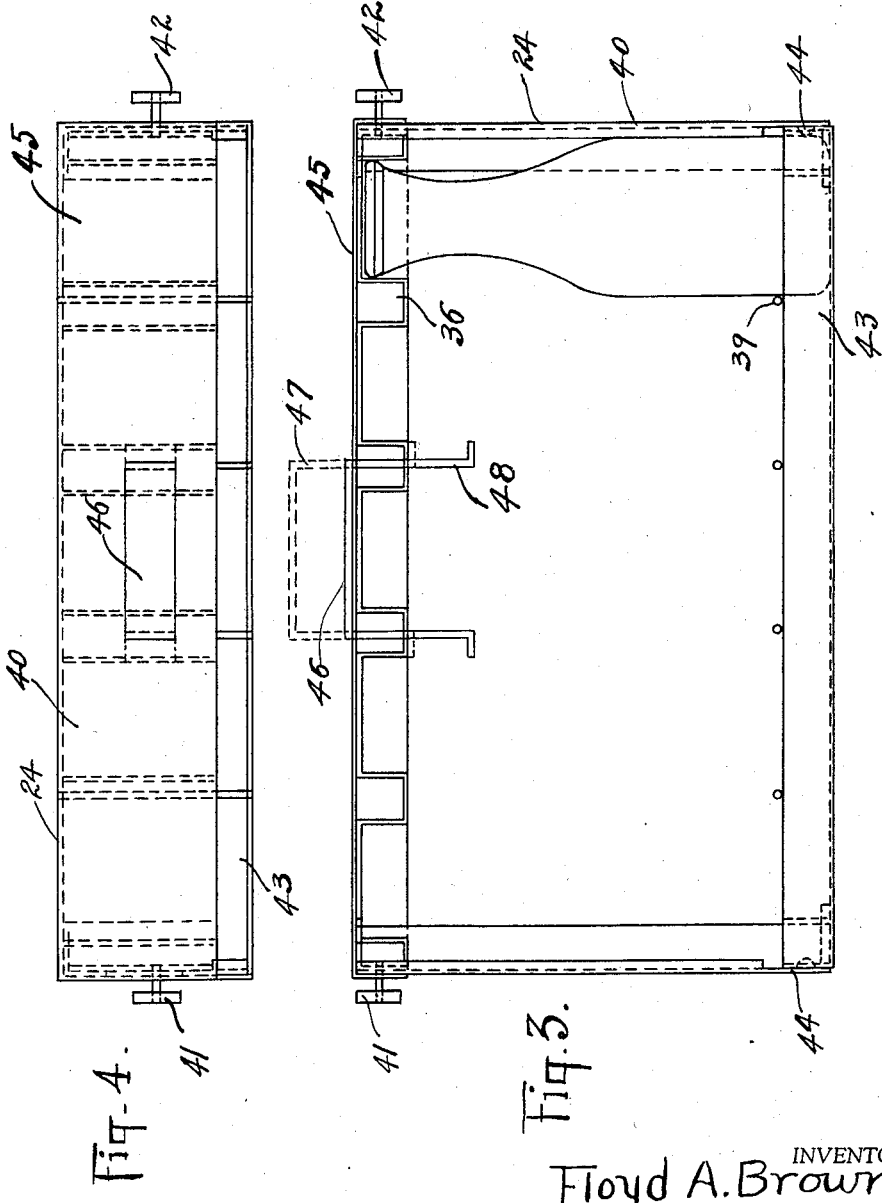

Nov. 28, 1939.   F. A. BROWNE   2,181,298
CONVEYING MECHANISM
Filed March 14, 1939   4 Sheets-Sheet 4

INVENTOR.
Floyd A. Browne
BY Lawler & Lawler
ATTORNEYS.

Patented Nov. 28, 1939

2,181,298

UNITED STATES PATENT OFFICE 2,181,298

CONVEYING MECHANISM

Floyd A. Browne, Cleveland, Ohio, assignor of one-half to J. D. Overholt, Wooster, Ohio Application March 14, 1939, Serial No. 261,857

1 Claim. (Cl. 198—1)

The invention relates to a conveying mechanism more particularly applicable to a milk delivery system and the like, in which the material conveyed is manually emptied or unloaded from the receptacles. The receptacles are then refilled with empty containers such as milk bottles, etc., and finally manually placed in another plane, leaving the next receptacle in place with its contents for subsequent delivery or deliveries.

According to the invention, when the conveying mechanism is loaded at the plant or dairy, all the receptacles are filled with products to be delivered to the respective customers. Some of the receptacles are placed in close side-by-side relation in the vertical plane, while others are placed end-to-end in the horizontal plane, so that all the receptacles are utilized. The conveying mechanism or a plurality of them may be then assembled in a unitary insulated structure and removably mounted in a truck or milk wagon or other conveyance adapted to receive the same.

When the products contained in the first vertical receptacle have been delivered, and the space formerly occupied thereby refilled with empty containers, such as milk bottles, the receptacle is manually pulled forward, and as it is pulled, the roller at the upper end of the receptacle engages the inclined portions hinges on the forward end of the upper trackway that extends down to meet the lower trackway, and lifts the same and passes therebeyond. The hinged inclined portions then return to their normal position by gravity. The receptacle is then manually forced up the incline, provided by the hinged inclined portions, into the upper trackway where it is supported at its forward end by the rollers engaging the upper trackway, and at its rear end by engaging the projecting flanges positioned below the upper trackway, so that the receptacle is slidably mounted in and on the supporting structure.

It will be seen that the weight of the receptacle is equalized in and on the supporting structure and further that space is economized. It will be further seen that the efficiency of the mechanism is increased by the elimination of mechanical parts, such as those shown in my more composite structures, comprising chains, etc., with the result that manufacturing costs are reduced.

When the receptacle furthest remote from the incoming receptacle is released from the upper trackway and supporting flanges it is guided and positioned automatically by controlled independently acting means that positions it in its proper place in the vertical plane in the lower trackway. The receptacle may be removed from the device for the purpose of cleaning and repairs.

The receptacle is collapsible so that it may be opened when removed from the device, so that the bottles may be easily placed therein and removed therefrom at the dairy or loading station.

The objects and advantages of the invention will become apparent as the description progresses.

In the accompanying drawings forming part of this specification, like reference characters are employed to designate corresponding parts throughout the same.

Figure 3 is a front elevation of the collapsible container showing the handle at its top, the handle is shown down in the solid line, and up in the chain line.

Figure 4 is a top plan of the receptacle shown in Figure 3.

Figure 2:
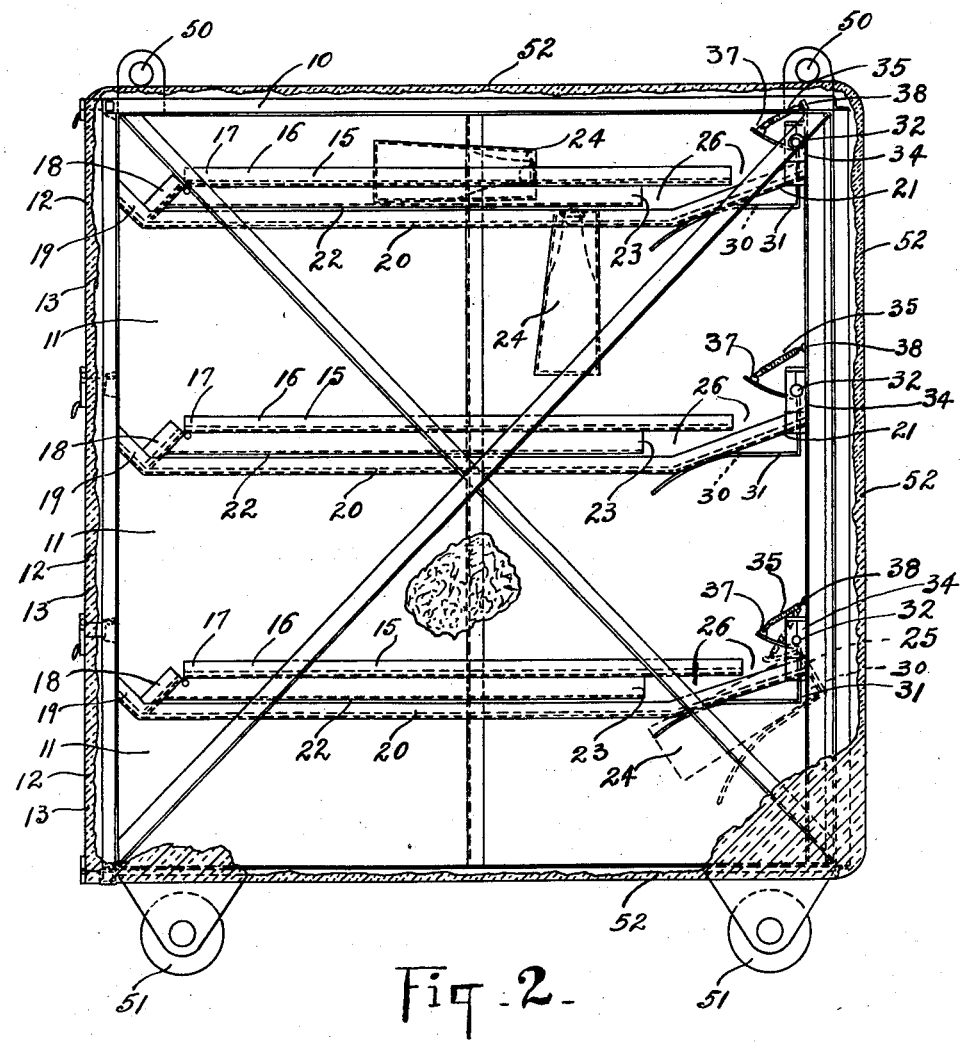
Figure 2 is a side elevation of the device, parts broken away to show insulation, and also showing the position of the track ways and supporting flanges therein.

The parts shown in this view are turned 90° to the left from their normal position as shown in the side elevation in Figure 2.

Referring to the drawings, wherein for the purpose of illustration, I have shown the new mechanism 10 generally designates the frame of the conveying mechanism.

The frame structure which in the present example is of elongated rectangular configuration comprises a plurality of compartments 11, and are similar as regards their leading dimensions. Each compartment is provided with a suitable hinged and latched door 12 properly insulated as at 13.

Figures 5, 6:
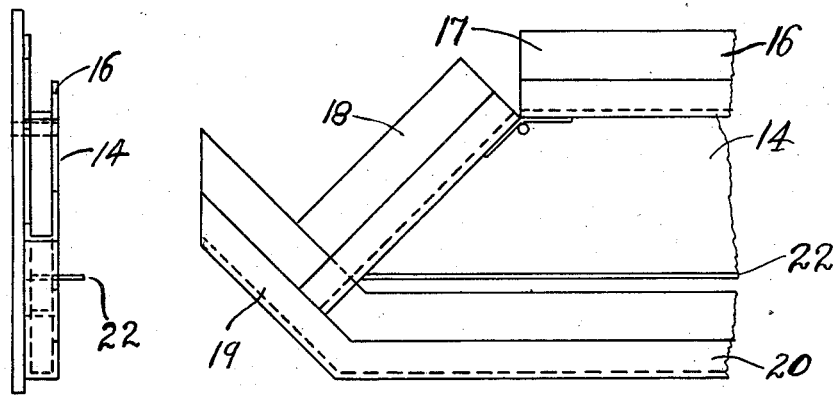
Figure 5 is an end view of the upper and lower trackway with the supporting flange therebetween.
Figure 6 is an enlarged fragmentary side view of the entrant or forward end of the trackway and the supporting flange.

Referring to the trackways 14 and 15 which are identical in their composite structure, save one is a right and the other is a left, it is thought that a detailed description of one will suffice, and reference is now made to Figure 5 and Figure 6 for that purpose.

Each trackway comprises an upper rail 16 having at the forward end 17 thereof a hinged inclined portion 18; a lower rail comprising three portions 19, 20, and 21. The section 20 is in spaced parallel relation with the upper rail 16, while the forward portion 19 is inclined upward from the rail 20 to prevent the receptacle from being accidentally displaced when it is pulled forward and under the hinged inclined portions 18. The end portion 21 remote from the portion 19 is also inclined upward but is given a long incline, for the purpose of guiding the receptacle after it is released from the upper track and the supporting flange into the lower trackway.

Figure 7:
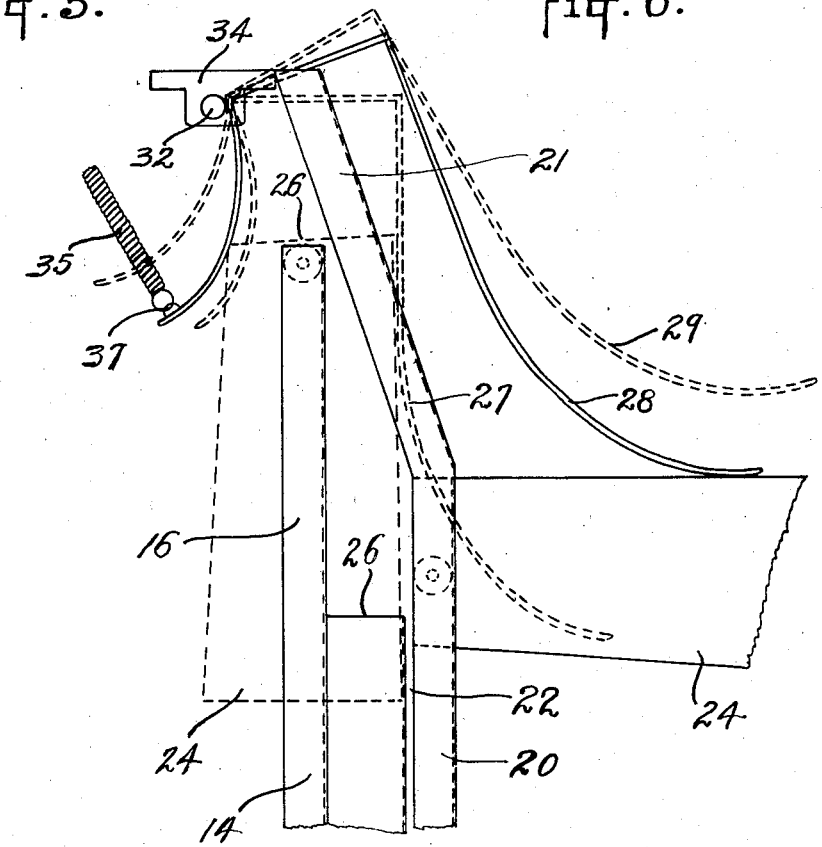
Figure 7 is an enlarged fragmentary view of the rear end of the trackways and the supporting flange, also showing the automatic controlling means.

The supporting flanges 22, 22, adapted to well withstand the sliding friction of the receptacle therealong, are spaced in fixed relation relative to the upper and lower track members and are of less length than the upper trackways, as shown at 23 in Figures 2 and 7 to permit the release of the receptacle 24 as shown in Figure 2 at 25.

It will be noted that the top rail 16 and the supporting flange 22 both stop short of the length of the lower rail, so that there is provided an opening at the end of the top rail and the supporting flange, see Figures 2 and 7 at 26. The receptacle is supported in its movement beyond the rails and supporting flanges by the automatic positioning means as shown by the chain lines 27, see Figure 7. The solid lines 28 shows the automatic positioning means forcing the receptacle into proper position in the vertical plane, while the chain lines 29 shows the automatic positioning means at substantially its extreme limits of actuation.

Figure 1:
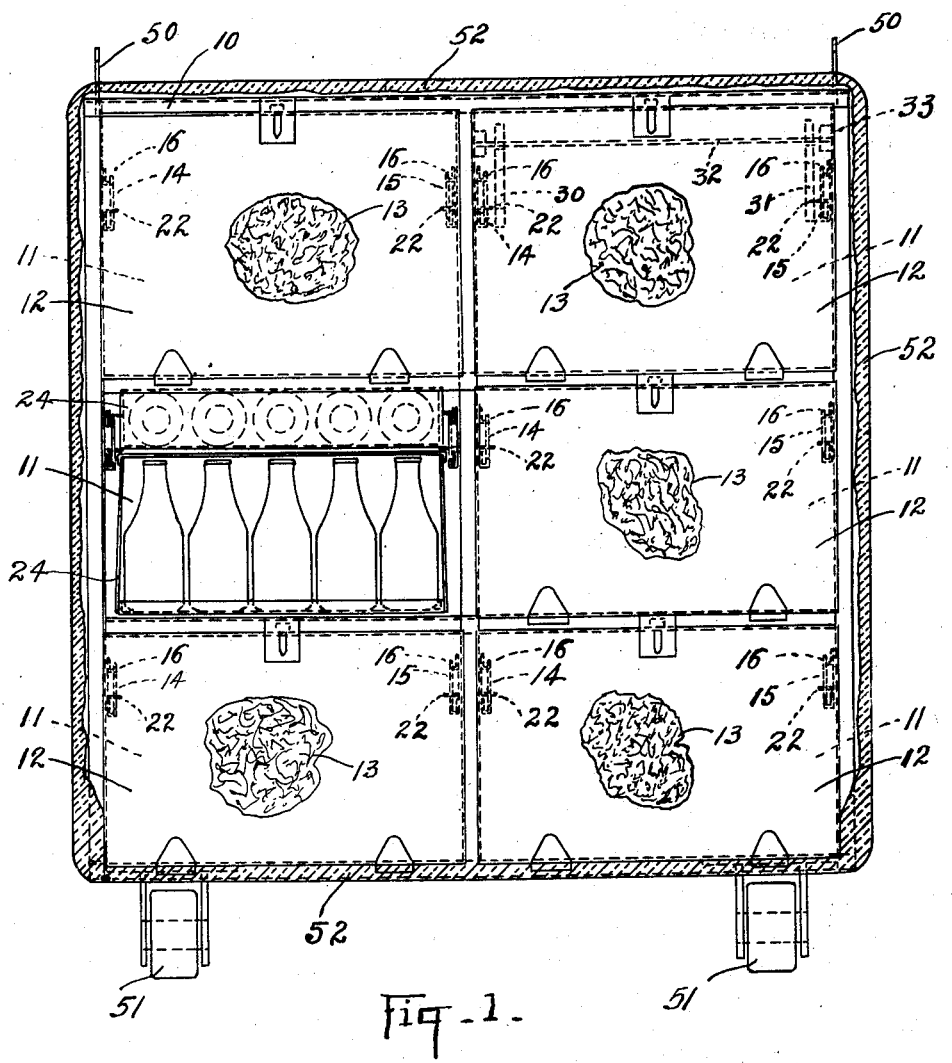
Figure 1 is an end elevation, parts broken away to show insulation of the device, and also showing a door removed from one of the compartments showing the receptacles therein loaded with milk bottles in the horizontal and vertical planes.

The automatic positioning means comprises two spaced members 30 and 31 connected to a transverse shaft 32, see Figure 1 at 33, which shaft is journalled in suitable bearings, one of which is shown at 34 in Figure 7.

The positioning means is controlled by spiral springs 35, see Figure 7, one end of which is attached to positioning means as at 37 while the other end is attached to the supporting structure as at 38, see Figure 2.

The receptacles 24 are each identical in structure, so that a description of one will suffice for all. The receptacle consists of a body portion 40 with oppositely positioned wheels 41 and 42. The bottom portion 43 of the receptacle is hinged to the body portion 40 and that the body portion and the bottom are held in locked position by the spring latch members 44, 44. The receptacle is provided on its top side 45 with a handle 46. The handle is slidably mounted so that it may be pulled up as shown in the chain line 47 in Figure 3 to provide a means to carry the receptacle. When it is not in use, it is pushed back as shown in the solid line 48 in Figure 3. The receptacle is provided with spacing members as shown at 36 and 39 to keep the bottles in spaced relationship in the receptacle, see Figure 3.

The conveying device is provided with eye members 50, one at each corner of the device so that it may be hooked to lift the same with a crane or other suitable means to facilitate easy handling of same.

The device is also provided with casters or rollers 51, so that the same may be easily moved from place to place on the floor in the dairy or loading station.

The device is properly insulated as shown at 52.

Since the operation of the various sets of mechanisms by which the purposes of the apparatus is achieved have been described in connection with the description of said mechanism, it is believed that a résumé of the entire device is unnecessary.

In a general way, while I have, in the above description, disclosed what I deem to be a practical and efficient embodiment of the present invention, it should be well understood that I do not wish to be limited thereto as there might be changes made in the arrangement, disposition and form of parts without departing from the principle of the present invention as comprehended without the scope of the accompanying claim.

What I claim is:

A device of the class described comprising a supporting structure, oppositely positioned trackways therein consisting of an upper trackway having at one end thereof an inclined hinged switching member, a sectionalized lower trackway below the upper trackway and joined to the upper trackway through the instrumentality of the hinged inclined switching member that rests on the lower trackway, supporting flanges positioned between the upper and lower trackways and projecting outwardly beyond the aforesaid trackways, a plurality of receptacles, spaced rollers on each of said receptacles at the top thereof, some of the said plurality of receptacles being mounted in the upper trackway by the rollers thereon and slidably supported on the supporting flanges by the structure of the receptacle that engages the supporting flanges when the receptacle is in the horizontal position in the trackway, while other of said plurality of receptacles are supported on the lower trackway by the spaced rollers thereon, and independent automatic controlling means adapted to position the released receptacle after it has been manually forced out of its position by the receptacle being placed in the upper trackway from the lower trackway.

FLOYD A. BROWNE.